United States Patent [19]

Cotsonas et al.

[11] Patent Number: 5,386,457
[45] Date of Patent: Jan. 31, 1995

[54] METHOD AND APPARATUS FOR RESOLVING CONTENTION BETWEEN MULTIPLE BASE UNITS DURING A CALL SETUP IN A PUBLIC CORDLESS TELEPHONE SYSTEM

[75] Inventors: George P. Cotsonas, Freehold; Kenneth Kasiske, Jackson; Dale E. Lynn, Freehold; Edwin A. Muth, Red Bank, all of N.J.

[73] Assignee: AT&T Corp., Murray Hill, N.J.

[21] Appl. No.: 70,003

[22] Filed: May 28, 1993

Related U.S. Application Data

[63] Continuation of Ser. No. 704,516, May 23, 1991, abandoned.

[51] Int. Cl.⁶ .......................................... H04M 11/00
[52] U.S. Cl. .................................. 379/61; 455/34.1
[58] Field of Search .................. 379/58, 59, 60, 61, 379/63; 455/33.1, 33.2, 34.1, 34.2

[56] References Cited

U.S. PATENT DOCUMENTS

| | | | |
|---|---|---|---|
| 4,414,661 | 11/1983 | Karlstrom | 455/33.1 |
| 4,771,448 | 9/1988 | Kochgoli et al. | 379/59 |
| 4,894,856 | 1/1990 | Nakanishi et al. | 455/34.2 |
| 4,926,421 | 5/1990 | Kawano et al. | 379/63 |
| 4,953,198 | 8/1990 | Daly et al. | 379/61 |

FOREIGN PATENT DOCUMENTS

| | | | |
|---|---|---|---|
| 0189920 | 8/1986 | European Pat. Off. | 379/60 |
| 0069221 | 3/1991 | Japan | 455/34.2 |

Primary Examiner—Curtis Kuntz
Assistant Examiner—Dwayne D. Bost
Attorney, Agent, or Firm—Samuel R. Williamson

[57] ABSTRACT

A cordless telephone public base unit employed in a public telephone system in close proximity with other public base units effectively avoids contention with these other base units for access to a cordless telephone handset unit generating a service request. Contention between the public base unit and the other public base units is resolved by assigning a specific one of a plurality of times during which the base unit may respond to the service request from the handset unit. The time in which the base unit responds to the service request may advantageously be determined by a randomly generated number, the received signal strength of the service request or a combination of these two parameters. Once access to the handset unit is acquired by a base unit and communications between these two units is established on a communications channel, all other handset units and base units are prevented from interfering with the communications between these two units.

24 Claims, 7 Drawing Sheets

METHOD AND APPARATUS FOR RESOLVING CONTENTION BETWEEN MULTIPLE BASE UNITS DURING A CALL SETUP IN A PUBLIC CORDLESS TELEPHONE SYSTEM

This application is a continuation of application Ser. No. 07/704,516, filed on May 23, 1991 now abandoned.

BACKGROUND OF THE INVENTION

1. Technical Field

This invention relates to public cordless telephone systems and more particularly to cordless telephone base units arranged for deployment in a public telephone system.

2. Description of the Prior Art

Telephone communications in public areas have traditionally been limited to a person using a public telephone where he or she could make either charge calls, pay calls or credit card calls. The mobility of the user has thus been limited to the immediate surroundings of the public telephone, as determined by the length of the telephone handset cord. Other alternatives, such as cellular telephone service and the new telepoint system, are expensive and therefore unattractive to many potential users.

One economical alternative to the public telephone is the new public cordless telephone system. Such a system is described in U.S. Pat. No. 4,953,198 which issued to J. J. Daly et al. on Aug. 28, 1990. The public cordless telephone system includes a plurality of public base units that are accessible by a plurality of portable or cordless telephone handset units. Each one of these handset units is capable of establishing communications with each one of the base units over a plurality of predetermined channels. Each one of these channels includes a radio frequency carrier signal that is modulated by switching signals and audio signals to and from a public base unit as appropriate. And the public base units are connected to telephone lines for providing conventional telephone communications for the handset units.

In the operation of the public cordless telephone system, communications between the handset unit and the public base unit is established by a user activating the handset unit which, in turn, interrogates the plurality of predetermined channels in order to establish communications with a public base unit on a nonbusy or available one of those channels. Once the handset unit selects an available channel, it transmits a service request which includes a handset identification code over this channel. A public base unit within the reception range of the handset unit receives the handset unit's identification code, appends its own identification code to this received code and then transmits the combined handset unit identification code and public base unit identification code back to the handset unit. The handset unit receives this combined code from the public base unit and then compares the handset portion of the received code with the code that it previously transmitted. If a favorable comparison of this code and the handset portion of the code received from the public base unit is obtained, communications is established between the handset unit and the public base unit on that selected channel.

If a handset unit happens to be within the reception range of two or more public base units that are capable or responding to the handset unit on the same channel, collision between these base units in responding to the handset unit may result. Thus if more than one public base responds to a handset unit at the same time, each code received by the handset unit is very likely to be rendered unintelligible by the other one or more received codes and the handset unit is forced to ignore all the receive codes and go through the process of generating another service request either on that channel or on another channel, hopefully with more favorable results the second time.

In order to prevent this collision between two or more public base units within the reception range of a handset unit requesting service, some public base units that are arranged in a cluster have been assigned to operate only upon one specific channel. Other public base units that are clustered and allowed to scan the available channels are controlled by a common control unit that prevents more than one of these public base units from attempting to respond to a service request coming from the same handset unit. Both of these arrangements have disadvantages, however. The demand for public cordless service is expected to grow over time and additional public base units for this service are expected to be periodically installed. Before these additional public base units may be installed close to other previously installed public base units, either exact knowledge of the assigned operating channels of the previously installed public base units or modification to the previously installed public base units will be required.

While the foregoing arrangements avoid contention between public base units in responding to a service request from a handset unit, it is desirable to have public base units capable of operation in close proximity to each other without interference and without the need for special configuration or modification of previously installed public base units as additional public base units are deployed in a public cordless telephone system.

SUMMARY OF THE INVENTION

In accordance with the invention, there is provided a public base unit suitable for operation in close proximity with other public base units in a public cordless telephone system while responding to a service request from a cordless telephone handset unit. In preferred embodiments, contention for access to the handset unit by the public base unit, and other base units similar configured, is resolved by assigning a specific one of a plurality of times during which the base unit may respond to the service request from the handset unit.

In one aspect of the invention, contention between public base units is resolved by assigning a time at which the base unit may respond to the handset unit as a function of a random number generated by the base unit. Thus when two or more public base units receive the same request for service from a handset unit, in preferred embodiments, a first public base unit having a random number of a smaller magnitude than the random number of a second public base unit would also have assigned thereto an earlier occurring response time for responding to the handset unit.

In another aspect of the invention, contention between public base units is avoided by assigning the time at which a base unit may respond as a function of the received signal strength from a handset unit requesting service. In this aspect of the invention, when two or more public base units receive the same request for service from a handset unit, a public base unit having the greater received signal strength from the handset unit would also have the earlier occurring response time for responding to the handset unit.

In yet another aspect of the invention, contention between base units is avoided by assigning the time during which a public base unit may respond to a handset requesting service (1) as a function of the received signal strength from the handset unit and (2) as determined by the generation of the random number. This operation advantageously provides a response time reflective of the received signal strength from the handset unit, the earlier occurring response time being provided to the base unit receiving the stronger signal. And through generation of the random number, a random factor is also provided in this response time.

BRIEF DESCRIPTION OF THE DRAWING

The invention and its mode of operation will be more clearly understood from the following detailed description when read with the appended drawing in which.

Throughout the drawing, the same element when shown in more than one figure is designated by the same reference numeral.

DETAILED DESCRIPTION

Figure 1:
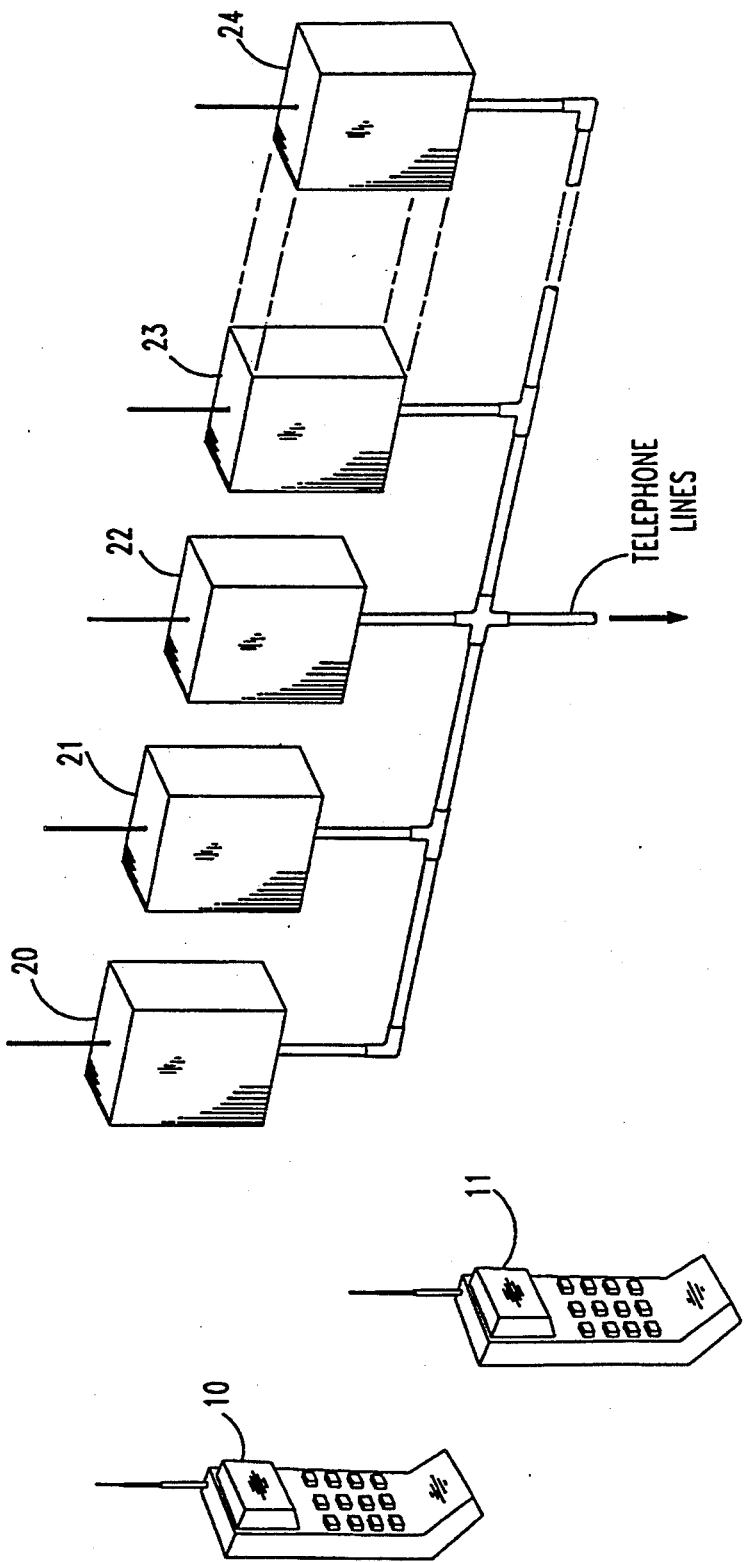
FIG. 1 depicts multiple handset units and multiple base units operative in accordance with the invention.

Referring now to FIG. 1 of the drawing, there are shown identical multiple cordless telephone handset units 10 and 11 and also identical multiple public base units 20 through 24. Each public base unit has its own assigned telephone tip-ring line and is capable of transmitting to and receiving from the handset units over each one of a plurality of predetermined channels. In the United States, ten frequency channels in the 46 through 49 MHz band available to date for use by cordless telephones. Each channel has two frequencies, one on which the base unit transmits and the handset unit receives and the other on which the handset unit transmits and the base unit receives.

Communication attempts between a handset unit and public base units are initiated by a user activating the handset unit which, in turn, interrogates the plurality of predetermined channels in order to establish communications with a base unit on one of those channels. When the handset unit is activated, it initializes a receiver and transmitter contained therein on a selected first one of the predetermined channels for respective reception and transmission thereon. If a public base unit is then engaged with and communicating with another handset unit on this selected first channel, this busy status of the public base unit is detected and no transmission by the handset unit of the user attempting to establish communications is made on this channel. Rather, the handset unit advances to the next channel, determines if that channel is available, or free, and continues on in this manner until an available channel is located.

If no carrier signal is detected on the selected first one of the predetermined channels, the handset unit generates a request-for-service message on this channel. If there is no answer within a predetermined time period, which could result if the handset unit is outside of the reception range of all of the public base units, the handset unit automatically advances to the next available channel. The handset unit then signals on this channel. If no answer is provided to the handset unit on this channel by a public base unit after this second attempt, the handset unit provides an appropriate out-of-range or busy indication to the user of the handset unit.

Figure 2:
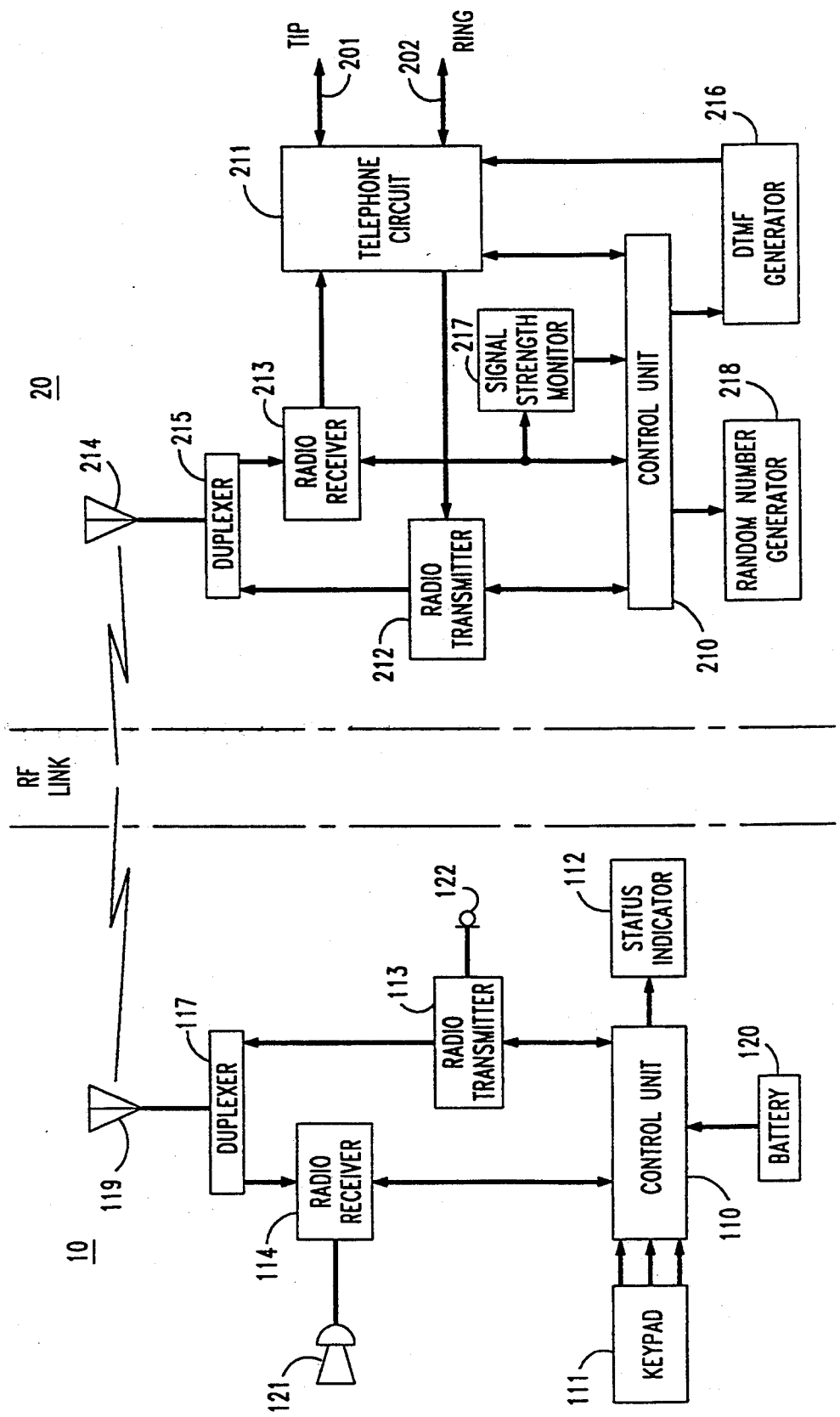
FIG. 2 is a block representation of the major functional components of one of the handset units and one of the public base units depicted in FIG. 1, operative in accordance with the invention.

Referring next to FIG. 2, there is shown a functional block representation of a public cordless telephone system operative in accordance with the principles of the invention. As shown, the public cordless telephone system generally comprises at least one handset unit 10 and at least one public base unit 20. With regard to the functional components illustratively described for handset unit 10, the handset unit 11, shown in FIG. 1, incorporates the same components as this handset unit and is operationally identical. Similarly, the public base units 21 through 24 of FIG. 1 incorporate the same components as the public base unit 20 and also are operationally identical.

Included in the handset unit 10 is a control unit 110 which advantageously provides a number of control functions. This control unit 110 may be implemented through the use of a microcomputer containing read-only-memory (ROM), random-access-memory (RAM) and the proper coding of this microcomputer. Such a microcomputer is known in the art and is readily available from semiconductor manufacturers such as Fujitsu, Motorola and NEC.

The control unit 110 generates an identification code that is transmitted from the handset unit 10 to the public base unit 20 while establishing initial communications as well as during the transfer of subsequent opcode data to the public base unit. This control unit 110 also configures a radio frequency (RF) transmitter 113 and a RF receiver 114 for operation on each of the plurality of predetermined channels for communicating with a selected one of the plurality of public base units operating on the selected predetermined channel. The transmitter 113 and the receiver 114 respectively transmits signals to and receives signals from the public base unit 20, with the control unit 110 providing channel control information to both units. The transmit and receive signals of the handset unit 10 are coupled to a duplexer 117 which permits the transmitter 113 and the receiver 114 to both simultaneously operate over antenna 119 while preventing the output of transmitter 113 from being coupled directly to the input of the receiver 114. The receiver 114 also demodulates voice signals transmitted by the public base unit 20 and couples these signals to a loudspeaker 121. The transmitter 113 has as its input speech signals from a microphone 122 which it transmits to the public base unit 20.

In operation, the receiver 114 is initially configured for sequentially interrogating and detecting an available channel for communicating with one of the plurality of public base units, such as base unit 20. When an available channel is detected, the channel information is provided to the control unit 110 from the receiver 114. The control unit 110 processes the appropriate channel selection and identification code data selected for use in the handset unit 10 and generates a request-for-service message which is transmitted by transmitter 113 over the available channel. This request-for-service message comprises a frequency shift keying (FSK) signal and includes a preamble and a synchronizing signal immediately followed by a data field which contains a service request code and the identification code generated by the control unit 110.

A battery 120 is included in the handset unit 10 and provides operating power for all circuitry in this unit. Also included in the handset unit is a keypad 111 and a handset unit status indicator 112. The keypad 111 is used for entering dial digits or control functions executed by the control unit 110 in the handset unit. The handset unit status indicator 112 contains, for example, light emitting diodes (LEDs) suitably arranged for providing the desired status indications. This status indicator 112 is connected to the control unit 110 and provides an indication to the user of the handset unit when (1) a communications link has been established between the handset unit 10 and the public base unit 20, (2) a communications link can not be established due to all base units being busy, or (3) a communications link can not be established due to the handset unit being outside of the reception range of a public base unit. A battery status indication reflective of the charge on the battery 120 is also provided by this status indicator 112.

Contained in the public base unit 20 is a control unit 210 which interfaces with control unit 110 in the handset unit 10 for receiving the appropriate identification code data and for establishing a two-way communications link between a handset unit and the public base unit 20. Also contained in the public base unit 20 are a transmitter 212 and receiver 213 for communicating with the selected handset unit. The output of the transmitter 212 and input for the receiver 213 are commonly coupled to an antenna 214 through a duplexer 215.

The control unit 210 also receives and processes opcode data provided by the handset unit 10 in dialing and providing tone signaling information out to a central office via telephone circuit 211 and tip-ting lines 201 and 202. The telephone circuit 211 serves as a "plain old telephone service"(POTS) interface for signals on the tip-ting lines and those respectively received by receiver 213 and transmitted by transmitter 212. Responsive to the control unit 210, a dual-tone-multiple-frequency (DTMF) generator 216 provides the signaling tones to the telephone circuit 211 for transmission over the tip-ting lines 201 and 202. The tip-ring lines 201 and 202 are preferably connected to a "charge-a-call" line which is provided with call screening, call blocking, call rating, and fraud protection through the telephone company's traffic service position system (TSPS) facilities for noncommercial credit card calls and through the telephone company's call processor for commercial credit card calls. The tip-ring lines 201 and 202 may also be connected to the telephone company central office via a measured business service line, typically referred to as a "1MB" line. In this arrangement, call screening, call blocking, call rating, and fraud protection are provided through the public base unit. A method for providing this type of protection for a telephone connected to a 1MB line is disclosed in U.S. Pat. 4,782,516 issued to R. L. Maybach on Nov. 1, 1988.

The control unit 210 receives the handset unit identification code, appends its own identification code to this received code and then stores this combined code in its RAM memory. The control unit 210 also transmits this combined code via FSK signals back to the control unit 110 in handset unit 10. This combined code thus uniquely identifies (a) the handset unit transmitting the original code, and thereby requesting service, as well as (b) the public base unit responding to the request for service. The handset unit receives this combined code from the public base unit and then compares the handset portion of the received code with the code that it previously transmitted. If a favorable comparison of the handset portion of the code received from the public base unit and the handset unit's previously transmitted code is obtained, communications is established between the handset unit and the public base unit on the selected channel. Once such a communications link is established, other cordless telephone handset units are precluded from establishing communications with a public base unit already engaged by a handset unit even if a handset unit erroneously determines that an occupied channel is idle and transmits its identification code.

The public base unit 20 detects radio link quality through use of a signal strength monitor circuit 217. This circuit is capable of differentiating between a range of receive signal levels and may be, for example, a received signal strength indicator (RSSI) circuit. An RSSI circuit produces an output voltage that is proportional to the strength of the received signal from the handset unit. Through use of an analog-to-digital converter associated with the signal strength monitor circuit 217, a corresponding digital signal output representative of the strength of the receive signal is selected from within the range of signal levels and provided to the control unit 210.

In a first application of this digital signal, the control unit 210 compares this voltage relative to a predetermined lower threshold level. If during the setting up of the call, the control unit determines that the communications link would be poor because of the received signal quality, the control unit does not allow the public base unit to respond to a handset unit requesting service. Also during operation, if the communications link between the handset unit and the public base unit degrades to a quality less than the predetermined lower threshold level, the control unit 210 causes the public base unit to generate an audible and distinctive tone which is recognizable to the user that he or she is then approaching the outer limit of the operating range for that handset unit in the public cordless telephone system.

In a second application of this digital signal and in accordance with the invention, the control unit 210 employs this digital signal to assist in resolving the contention between multiple public base units attempting to respond to a request-for-service signal or message generated by a handset unit. In this application, the time for response for the public base unit is determined by the received strength of the signal from the handset unit. This application is described in greater detail later herein.

Included in the public base unit 20 is a random number generator 218, which is shown distinctly. It should be understood, however, that the functions performed by this generator may also be performed by control unit 210. In accordance with the invention, the generator 218 generates a random number to assist in resolving the contention between multiple public base units attempting to respond to a request-for-service signal, or message, generated by a handset unit. This operation is described in greater detail later herein.

Figure 3:
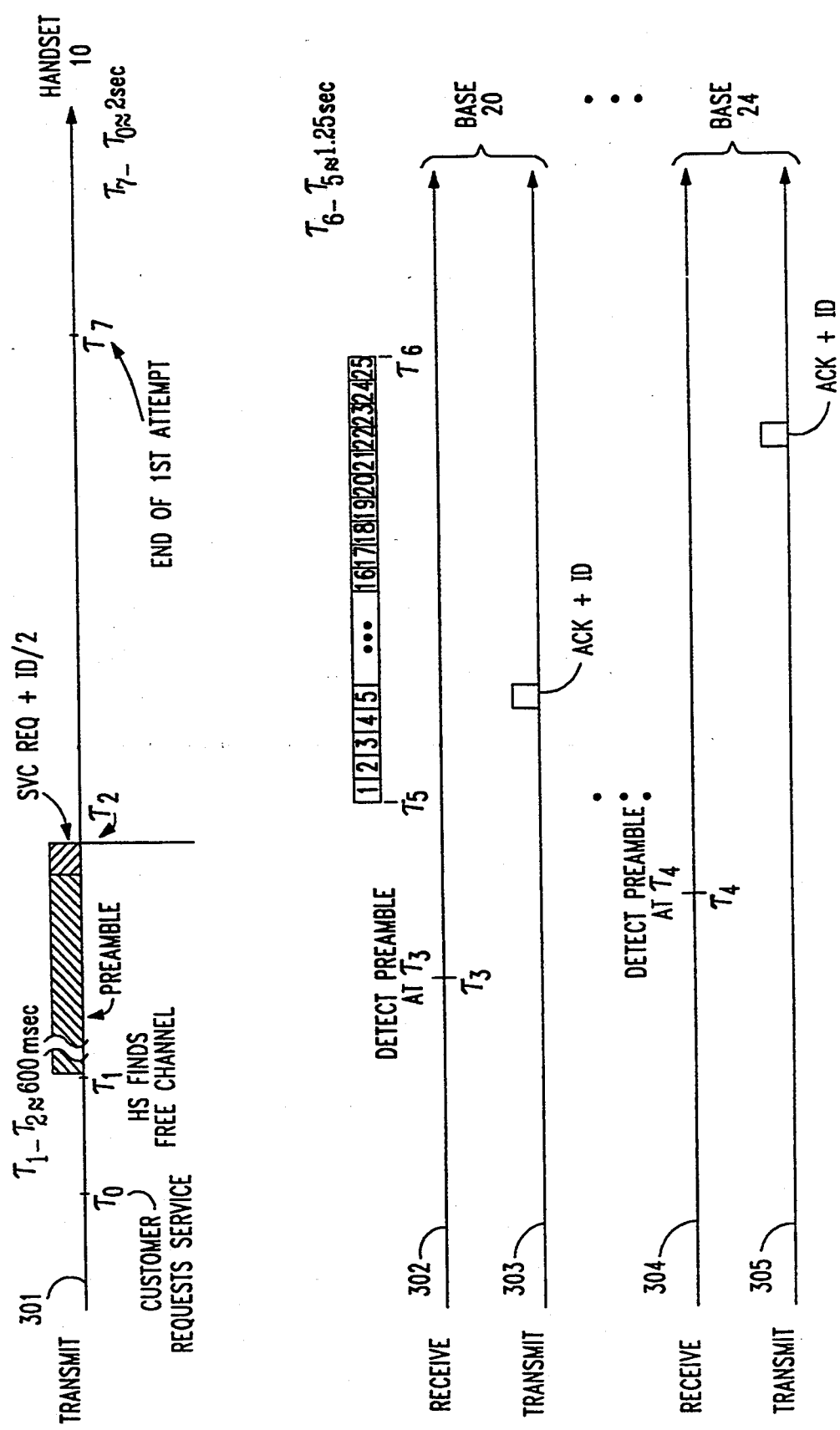
FIG. 3 is a tinting diagram for illustrating the operation of the public base units of FIG. 1, in accordance with the invention.

Referring next to FIG. 3 in combination with FIG. 2, there is shown in FIG. 3 a timing diagram for illustrating the operation of multiple public base units in resolving contention for responding to a request-for-service message generated by a cordless telephone handset unit, in accordance with the invention. Illustratively depicted in this timing diagram are related time lines 301 through 305. Line 301 illustrates the timing sequences for, by way of example, handset unit 10 in attempting to establish communications with one of the multiple public base units. Lines 302 and 303 respectively illustrate the receive and transmit sequences of, for example, public base unit 20 in attempting to respond to a request-for-service message received from handset 10. And lines 304 and 305 respectively illustrate the receive and transmit sequences of, for example, public base unit 24 (FIG. 1) in attempting to respond to the request-for-service message received from handset unit 10.

For establishing communications between a handset unit and a public base unit, a user within the coverage area of at least one of the public base units 20 through 24, shown in FIG. 1, requests service by pushing an activation button on the keypad 111 of handset unit 10. In response, the receiver 114 in handset unit 10 first listens for a carrier signal on a selected first one of the plurality of predetermined channels. If a carrier is detected on this channel at a level above a certain minimum threshold, this is an indication that this channel is already busy with a public base unit communicating with another handset unit. In this event, the handset unit advances to the next one of the predetermined channels, determines if that channel is available, or free, and continues on in this manner until an available channel is located. The handset unit takes approximately 30 milliseconds to interrogate all the predetermined channels. This time interval is illustrated on line 301 as time $\tau_0$ to time $\tau_1$. If after interrogating all of the channels, the handset unit does not find an available one, an all-channels-busy signal is provided to the user of the handset unit.

Once the handset unit has selected an available channel at time $\tau_1$ or earlier, it then transmits a preamble over this selected channel. The preamble is approximately 545 milliseconds in length and comprises alternating 2.5 millisecond marks and spaces transmitted prior to a synchronization period and data field. The synchronization period is 16.5 milliseconds in length and is immediately followed by a 36.75 millisecond data field which includes the request-for-service message. This request-for-service message includes an 8-bit service request (SVC REQ) code and eight of the sixteen bits of the identification code (ID/2) used when communication between a handset unit and a public base unit has been established. The other eight bits of this identification code are to be provided by the public base unit which establishes communications with the handset unit.

During the time that a public base unit is not involved in a call with a handset unit, it repeatedly scans all of the predetermined channels spending 20 milliseconds per channel looking for the preamble that is part of the transmission of a handset unit generating a request-for-service message. The 545 millisecond preamble transmitted by the handset unit 10 provides sufficient time for a public base unit to scan each of the predetermined channels and arrive at the channel having the preamble sometime before the beginning of both the synchronizing signal and the request-for-service message. Line 302 shows public base unit 20 detecting the preamble at time $\tau_3$. If other nearby public base units are available and located within the reception range of the signal from handset unit 10, they will also be scanning over the predetermined channels and will detect the preamble sometime before the beginning of the synchronizing signal and the request-for-service message. Thus line 304 shows that public base unit 24 detects the preamble at time $\tau_4$. Upon detection of this preamble, each of these two public base units, as well as any others that similarly detect it, will stop scanning the predetermined channels and remain on the channel having the preamble in order to receive and respond to the request-for-service message.

After the public base unit 20 has received the request-for-service message at time $\tau_2$, the control unit 210 causes the random number generator 218 to generate a random number. This number corresponds to a particular one of multiple contiguous time slots during which public base unit 20 will respond to the request-for-service message. The control unit in public base 24 and in all of the other public base units receiving this request-for-service message similarly perform or have an associated random number generator perform this same operation. The public base unit 20 may have, for example, 25 discrete time slots in which it may respond, beginning at time $\tau_5$ and ending at time $\tau_6$.

If, as illustrated on line 303, random number generator 218 has generated a random number which corresponds to time slot number five, public base unit 20 will transmit a service request acknowledgment message which includes an 8-bit acknowledgment code (ACK) and an identification code (ID) on the selected channel within a time corresponding to this time slot back to the handset unit 10. As earlier indicated herein, this identification code will be a combination of the 8-bit handset unit identification code along with an 8-bit appended identification code that is unique to this particular public base unit. As illustrated on line 305, an associated random number generator unit (not shown) for public base unit 24 has also generated a random number which corresponds to time slot number twenty-two. Thus, in the time corresponding to this slot, public base unit 24 will similarly transmit a service request acknowledgment message which includes its ACK and its ID on the selected channel to the handset unit 10.

Contention between the public base units for access to the handset unit is resolved by this sequencing process. The first service request acknowledgment message received from a public base unit that is accompanied by the handset unit's own identification code is processed by the handset unit. The handset unit then adopts the entire identification code which is a combination of its own identification code and the identification code provided by the public base unit. This combined identification code thus becomes the unique identification code used for any subsequent signaling between the handset unit and the public base unit during this particular call. All other public base units receiving the request-for-service message from the handset unit will send their acknowledgment messages to the handset unit in accordance with time slots corresponding to their respectively assigned random number, but the handset unit ignores all subsequently received service request acknowledgment messages since they are not accompanied by the identification code that is then being recognized by the handset unit.

In the event that the handset unit does not receive an acceptable service request acknowledgment message by time $\tau_7$, then the handset unit will in effect start again at time $\tau_0$, advance to the next available channel and repeat the above described sequence once again. Repeating this sequence minimizes the possibility that the handset unit will not be able to establish communications with a public base unit as a result of collision between two or more public base units generating the same random number and then transmitting in the same time slot. Indeed, the chances of two or more public base units independently generating identical random numbers during both communications attempts by the handset unit is extremely remote. This advantageous operation is achieved since the time for each service request acknowledgment message generated by each base unit is determined by a random number selected from 25 possible numbers. If two or more service request acknowledgment messages provided in a first sequence happen to be generated in the same time slot, the handset unit ignores these acknowledgment messages and a second execution of the sequence is provided. During the second sequence, it is highly unlikely that these public base units would again independently generate the same random number. If the handset unit has not received an acceptable service request acknowledgment message by the time $\tau_7$ arrives a second time, then the handset unit issues the appropriate busy or out-of range signal to its user.

Figure 4:
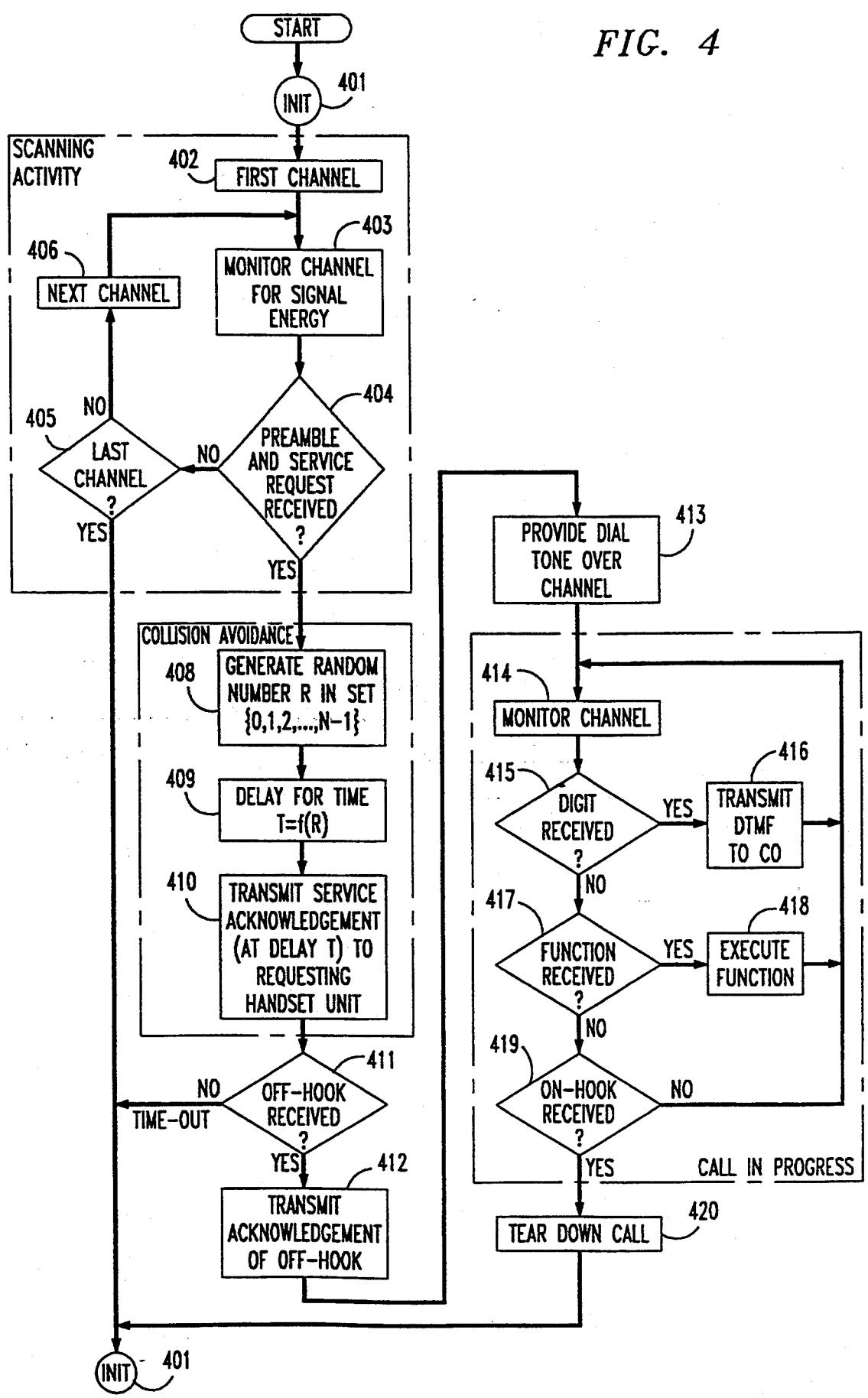
FIG. 4 depicts a flow chart illustrating an implementation for operation of a public base unit in a public cordless telephone system in accordance with the invention.

Referring next to FIG. 4 there is shown a flow chart illustrating an implementation of the public base unit 20 for operation in a public cordless telephone system with the desired functionality. Contention for access to a handset unit by this public base unit and others similar configured is resolved by this operation, in accordance with the invention. In the implementation, contention between base units is avoided by assigning the response time at which a base unit may reply to a handset unit as a function of a random number generated by the base unit. Thus when two or more public base units receive the same request for service from a handset unit, a first public base unit having a random number of a smaller magnitude than the random number of a second public base unit would also have assigned thereto an earlier occurring response time. The functions in this flow chart are advantageously provided by a process or program stored in ROM associated with the control unit 210 and executed by this control unit 210 and the random number generator 218.

The process is entered at an initialization step 401 where the public base unit is configured in the on-hook condition. The process next enters a scanning activity routine and advances to step 402 where the public base unit is set to a first selected one of the predetermined channels. From this step, the process advances to step 403 where the selected channel is monitored by the public base unit for an incoming signal energy from a handset unit. The process next advances to decision 404 where a determination as to whether a preamble and service request signal has been received. If a signal is not received at decision 404, the process advances to decision 405 where a determination is made as to whether the selected channel that was just monitored was the last one in the set of the predetermined channels. If the channel monitored was not the last one of the predetermined channels, the process advances to step 406 where the next channel to be monitored briefly for an incoming signal is selected. If at decision 406, the last one of the predetermined channels has been monitored, the process returns to the initialization step and begins to sequentially monitor each of the predetermined channels for activity thereon once again.

If at decision 404 a preamble and service request signal is determined to be present on the selected channel, the process advances to decision 408 where a random number R is generated. This number R is generated from a set of numbers which range from 0 to N−1 and which corresponds to N contiguous time slots. Although capable of responding in any time slot, it is in a specifically selected one of these time slots that the public base unit transmits its service request acknowledgment message back to the handset unit on the selected channel. The number of time slots may be 25 as illustrated in FIG. 3. Any reasonable number of time slots may be employed, however, in order to achieve the desired plurality of possible delay times after which a public base unit may respond to a request-for-service message provided by a handset unit. By limiting the possible time for response by the public base unit to the time slot determined by the random number R advantageously provides a random delay for a time T as a function of R to be associated with this response.

From step 408, the process advances to step 409 where the process is delayed for a time interval corresponding to the time T. When this time interval has expired, the process advances to step 410 where the public base unit transmits a service request acknowledgment message to the requesting handset unit. As described earlier herein, this service request acknowledgment message also will be accompanied by an identification code which is composed of unique codes from both the handset unit generating the request-for-service message and also the responding public base unit.

From the step 410, the process advances to the decision 411 where a determination is made as to whether an off-hook signal is received from the handset unit in response the service response acknowledgment message transmitted by this public base unit. If an off-hook signal is not received from the handset unit in a predetermined time, typically 200 milliseconds, a time-out occurs at the public base unit and the process returns to the initialization step 401 where the monitoring of the predetermined channels for an incoming call is resumed. If an off-hook signal is received at decision 411, the process advances to step 412 where an acknowledgment message of the off-hook signal is transmitted on the selected channel to the handset unit. With the successful completion of these steps, the public base unit is seized by the handset unit and operates as a dedicated base unit in step 413 providing dial tone to the handset unit and establishing a communications link over the selected channel.

Most communications with the handset unit by the public base unit are in the form of opcode messages and include the identification code then shared by the public base unit and the handset unit. As the public base unit ignores any inadvertent messages on the selected channel that do not include this identification code, in the same manner, the handset unit also ignores any inadvertent messages on the selected channel that do not include this identification code.

Once the communications link has been established, the process enters a call-in-progress routine and advances to step 414 where it monitors the selected channel for receipt of a digit. In decision 415, any digit received from the assigned handset unit over the selected channel by the public base unit is detected and in step 416 this digit is translated into a dual-tone-multiple-frequency signal and transmitted to the central office.

If the receipt of a digit over the selected channel is not detected in decision 415, the process advances to decision 417 which monitors the receipt of function requests provided over the selected channel. If a function request is received, the process advances to step 418 where the function request is executed. By way of illustration of a function request, one opcode message from the handset unit to the public base unit is to terminate an existing call and begin a new call. Thus upon receipt of this request, the public base unit terminates the existing call and provides dial tone to the handset unit. The process then returns to the routine at step 414. If a function request is not received at step 417, the process advances to decision 419 which looks for an on-hook opcode message reflecting that the user desires to terminate the call. If this opcode message is not received, the process returns to step 414 and repeats this call-in progress routine. If this opcode message is received, however, the public base unit is released in the call-tear-down step 420, the process returns to the initialization step 401 where the public base unit goes on hook and the process once again begins to monitor each of the predetermined channels for an incoming signal.

Figure 5:
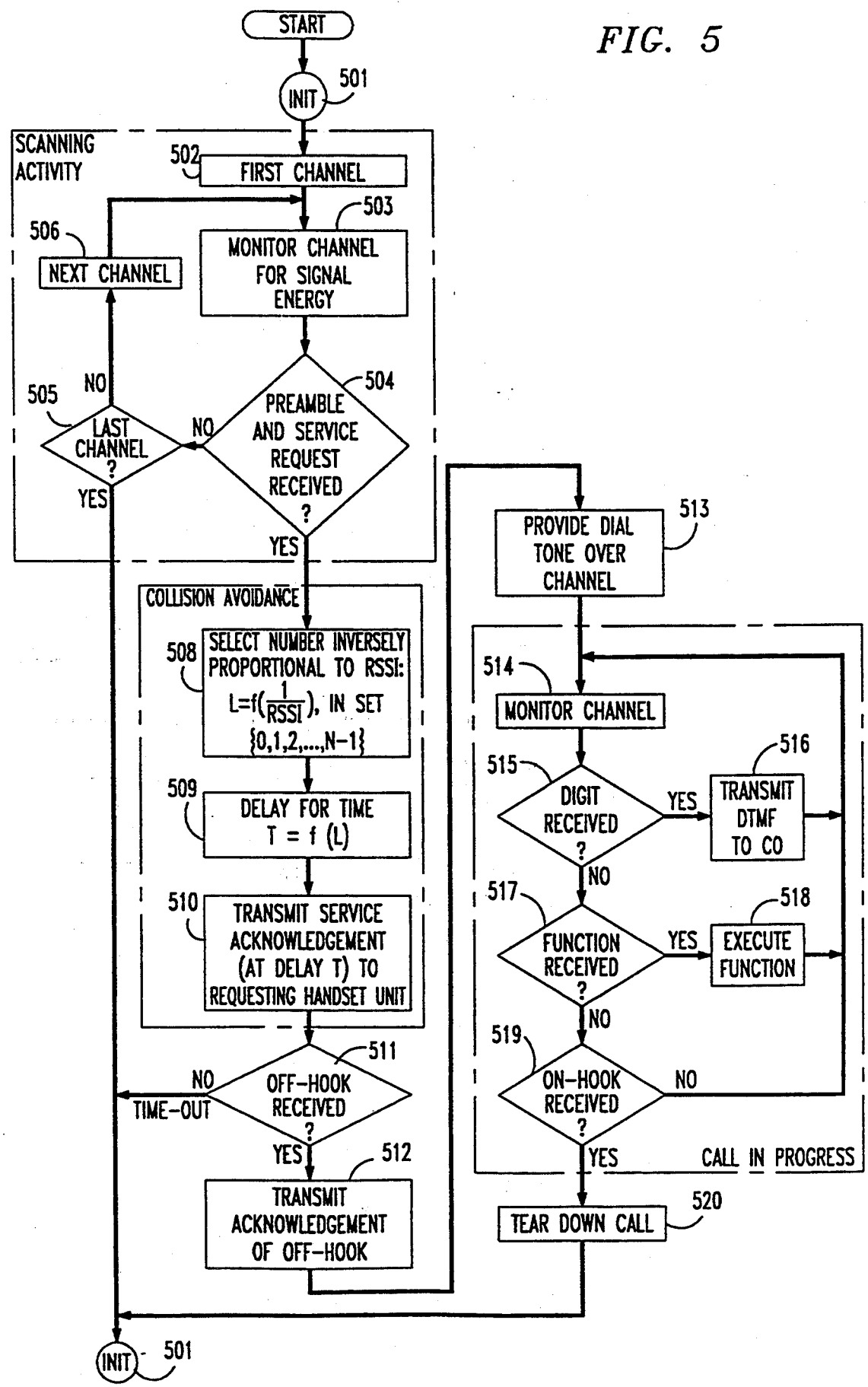
FIG. 5 depicts a flow chart illustrating an alternative implementation for operation of a public base unit in a public cordless telephone system in accordance with the invention.

Referring next to FIG. 5 there is shown a flow chart illustrating an alternative implementation of the public base unit 20 for operation in a public cordless telephone system. This alternative implementation of the public base unit is operable in avoiding contention for access to a handset unit between the base unit 20 and others similar configured, in accordance with the invention. In this implementation, contention between base units is avoided by assigning the response time at which a base unit may reply as a function of the received signal strength from a handset unit requesting service. Thus when two or more public base units receive the same request for service from a handset unit, a public base unit having the greater received signal strength from the handset unit would also have the earlier occurring response time for responding to the handset unit. The functions in this flow chart are advantageously provided by a process or program stored in ROM associated with the control unit 210.

The process is entered at an initialization step 501 where the public base unit is configured in the on-hook condition. The process next enters a scanning activity routine and advances to step 502 where the public base unit is set to a first selected one of the predetermined channels. From this step, the process advances to step 503 where the selected channel is monitored by the public base unit for an incoming signal from a handset unit. The process next advances to decision 504 where a determination as to whether an incoming signal has been received is made. If a signal is not received at decision 504, the process advances to decision 505 where a determination is made as to whether the selected channel that was just monitored was the last one in the set of the predetermined channels. If the channel monitored was not the last one of the predetermined channels, the process advances to step 506 where the next channel to be monitored briefly for an incoming signal is selected. If at decision 506, the last one of the predetermined channels has been monitored, the process returns to the initialization step and begins to sequentially monitor each of the predetermined channels for activity thereon once again.

If at decision 504 an incoming signal is determined to be present on the selected channel, the process advances to decision 507 where a determination is made as to whether the signal is a preamble and service request signal from a handset unit. If the received signal is not a preamble and service request signal, the process returns to step 501. If the received signal is a preamble and service request signal, the process enters a collision avoidance routine and advances to step 508 where a number L is selected from a set of numbers between 0 to N−1. This set of numbers corresponds to N contiguous time slots which are inversely proportioned in magnitude to the strength of the signal received from the handset unit. That is, the smallest number in the set is indicative of the strongest received signal and the largest number in the set is indicative of the weakest received signal. With a RSSI value obtained from the signal strength monitor 217, shown in FIG. 2 and described earlier herein, the number L corresponding to one of the numbers in the set is selected. It is in the corresponding one of the time slots that the public base unit transmits its service response acknowledgment message back to the handset unit on the selected channel. This number of time slots is typically 25, however, any reasonable number of time slots may be employed in order to achieve the desired number of possible delay times after which a public base unit may respond to a request-for-service message provided by a handset unit. By limiting the time for response by the public base unit to the specific time slot represented by the selected number L advantageously provides a delay for a time T as a function of the RSSI value to be associated with this response.

From step 508, the process advances to step 509 where the process is delayed for a time interval corresponding to the time T. When this time interval has expired, the process advances to step 510 where the public base unit transmits a service response acknowledgment message to the requesting handset unit. This service acknowledgment message also will be accompanied by an identification code which is composed of unique codes from both the handset unit generating the request-for-service message and also the responding public base unit.

From the step 510, the process advances to the decision 511 where a determination is made as to whether an off-hook signal is received from the handset unit in response the service response acknowledgment message transmitted by this public base unit. If an off-hook signal is not received from the handset unit in a predetermined time, a time-out occurs at the public base unit and the process returns to the initialization step 501 where the monitoring of the predetermined channels for an incoming call is resumed. If an off-hook signal is received at decision 511, the process advances to step 512 where an acknowledgment message of the off-hook signal is transmitted on the selected channel to the handset unit. With the successful completion of these steps, the public base unit is seized by the handset unit and operates as a dedicated base unit in step 513 providing dial tone to the handset unit and establishing a communications link over the selected channel.

Once the communications link has been established, the process enters a call-in-progress routine and advances to step 514 where it monitors the selected channel for receipt of a digit. In decision 515, any digit received from the assigned handset unit over the selected channel by the public base unit is detected and in step 516 this digit is translated into a dual-tone-multiple-frequency signal and transmitted to the central office.

If the receipt of a digit over the selected channel is not detected in decision 515, the process advances to decision 517 which monitors the receipt of function requests provided over the selected channel. If a function request is received, the process advances to step 518 where the function request is executed. If a function request is not received at step 517, the process advances to decision 519 which looks for an on-hook opcode message reflecting that the user desires to terminate the call. If this opcode message is not received, the process returns to step 514 and repeats this call-in progress routine. If this opcode message is received, however, the public base unit is released in the call-tear-down step 520 and the process returns to the initialization step 501 where the public base unit once again begins to monitor each of the predetermined channels for an incoming signal.

Figure 6:
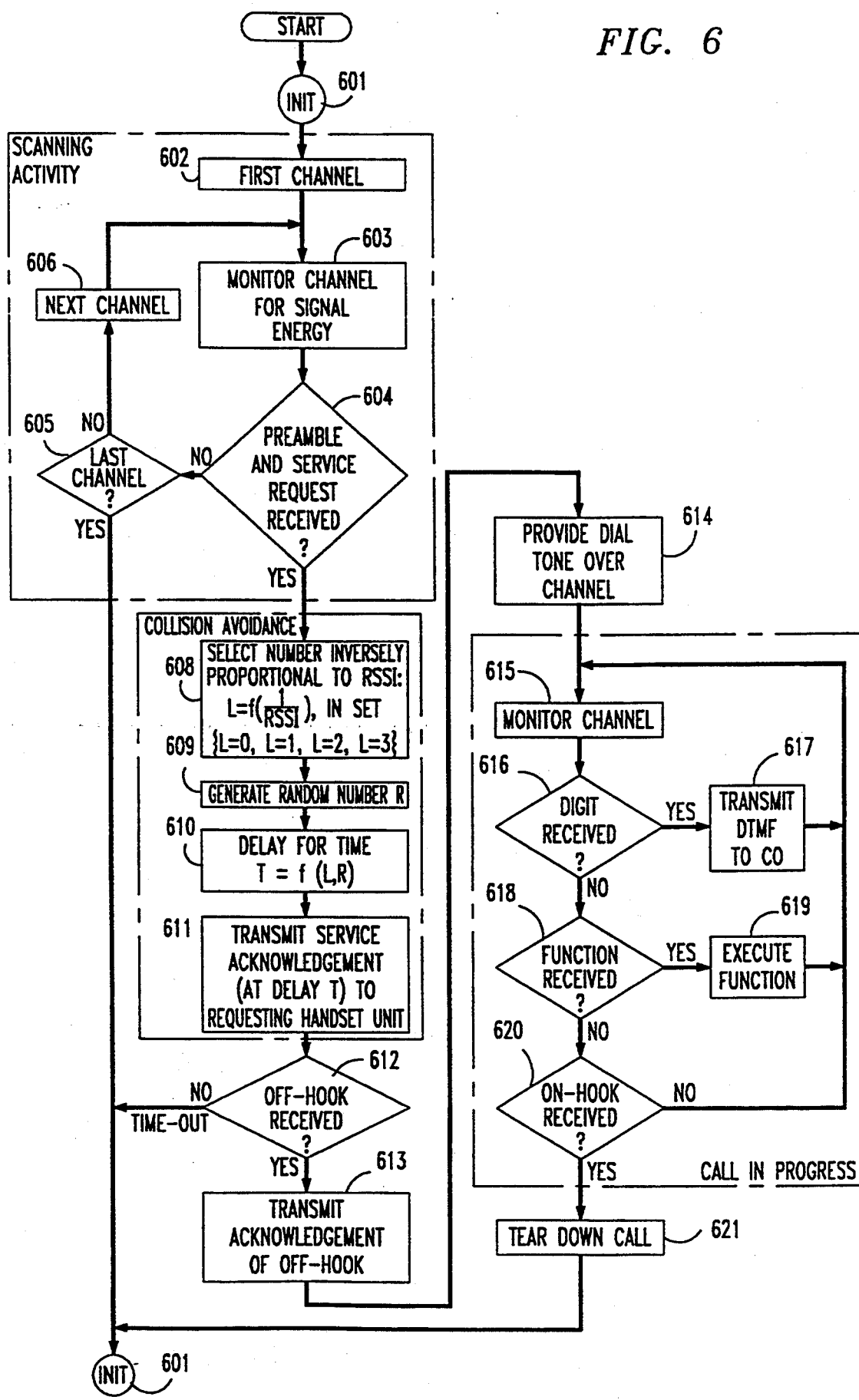
FIG. 6 depicts a flow chart illustrating another alternative implementation for operation of a public base unit in a public cordless telephone system in accordance with the invention.
Figure 7:
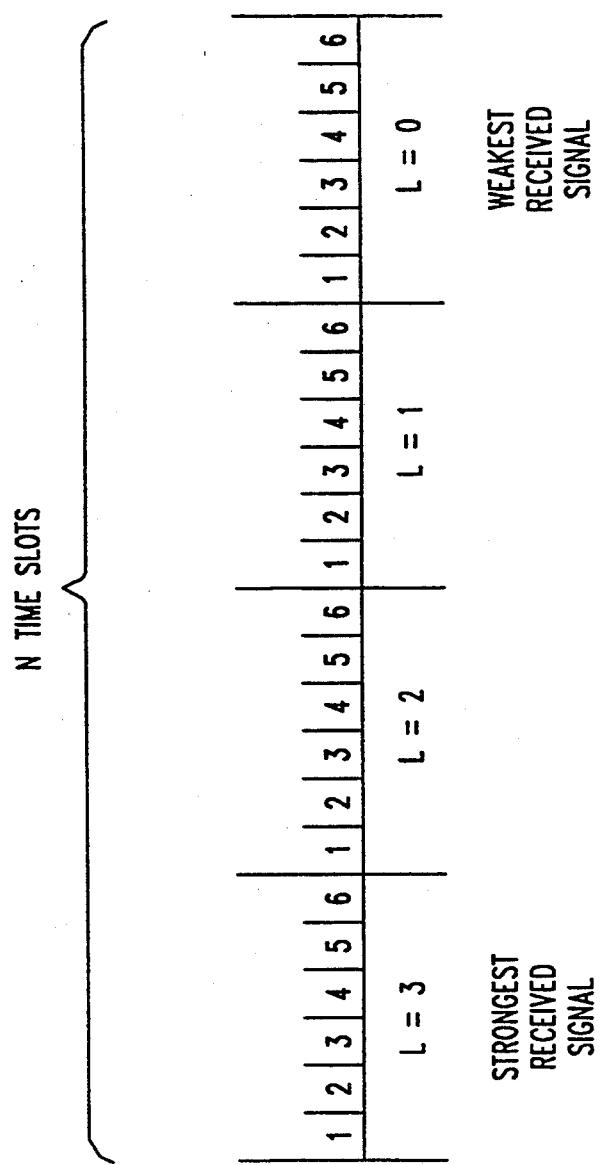
FIG. 7 shows a set of contiguous time slots segmented into multiple subsegments for assigning a received signal therein in accordance with the strength of the received signal and in accordance with the invention.

Referring next to FIG. 6 there is shown a flow chart illustrating another alternative implementation of the operation of public base unit 20. This alternative implementation of the operation of the public base unit is operable in avoiding contention for access to a handset unit between the base unit 20 and others similar configured, in accordance with the invention. In this implementation, contention between base units is avoided by assigning the response time during which a public base unit may reply to a handset requesting service (1) as a function of the received signal strength from the handset unit and (2) as determined by the generation of a random number R. This operation will be more apparent when FIG. 7 is considered in conjunction with FIG. 6. The functions shown in the flow chart of FIG. 6 for achieving this operation are advantageously provided by a process or program stored in ROM associated with the control unit 210 and executed by this control unit 210 and the random number generator 218.

In accordance with this implementation of the invention, a set of contiguous time slots N is segmented into subsets in accordance with the received signal strength L from a handset unit. The set thus comprises N/L subsets where N represents the total number of time slots and L represents the number of received signal strength signal levels. The random number R is generated to correspond to one of the contiguous time slots in each of the subsets L=0 through L=3. The generation of this number R and assigning the corresponding time slot to a public base unit advantageously avoids the collision that might otherwise result between two or more public base units receiving the same signal strength level L from a handset unit requesting service.

The process is entered at an initialization step 601 where the public base unit is configured in the on-hook condition. The process next enters a scanning activity routine and advances to step 602 where the public base unit is set to a first selected one of the predetermined channels. From this step, the process advances to step 603 where the selected channel is monitored by the public base unit for an incoming signal from a handset unit. The process next advances to decision 604 where a determination as to whether an incoming signal has been received is made, If a signal is not received at decision 604, the process advances to decision 605 where a determination is made as to whether the selected channel that was just monitored was the last one in the set of the predetermined channels. If the channel monitored was not the last one of the predetermined channels, the process advances to step 606 where the next channel to be monitored briefly for an incoming signal is selected. If at decision 606, the last one of the predetermined channels has been monitored, the process returns to the initialization step and begins to sequentially monitor each of the predetermined channels for activity thereon once again.

If at decision 604 an incoming signal is determined to be present on the selected channel, the process advances to decision 607 where a determination is made as to whether the signal is a preamble and service request signal from a handset unit. If the received signal is not a preamble and service request signal the process returns to step 601. If the received signal is a preamble and service request signal, the process enters the collision avoidance routine and advances to step 608 where a value L from the subsets L=0 through L=3 is selected in accordance with the RSSI value obtained from the signal strength monitor 217, shown in FIG. 2. As shown in FIG. 7, The subset L=3 is indicative of the strongest received signal and the subset L=0 is indicative of the weakest received signal. Although only four subsets are shown, it is to be understood that the number of subsets may be other than as specifically shown.

Once the value L is selected at step 608, the process advances to step 609 where the random number R is generated. This number R is generated from a group of numbers contained within each subset L=0 through L=3. This group of numbers is representative of the number of contiguous time slots available within each subset which is illustratively shown as six in FIG. 7. It is to be understood, however, that this group of numbers, and thus the corresponding time slots, may be other than as specifically shown. When the time slot corresponding to the random number R is designated within the appropriate subset L, the public base unit transmits its service response acknowledgment message back to the handset unit on the selected channel in this selected time slot. By limiting the possible time for response by the public base unit to the specifically selected subset L and to a time slot within that subset determined by the random number R advantageously provides a delay for a time T as a function of the RSSI value as well as a random factor for this delay time.

From step 609, the process advances to step 610 where the process is delayed for a time interval corresponding to the time T. When this time interval has expired, the process advances to step 611 where the public base unit transmits a service response acknowledgment message to the requesting handset unit. From the step 611, the process advances to the decision 612 where a determination is made as to whether an off-hook signal is received from the handset unit in response the service response acknowledgment message transmitted by this public base unit. If an off-hook signal is not received from the handset unit in a predetermined time, a time-out occurs at the public base unit and the process returns to the initialization step 601 where the monitoring of the predetermined channels for an incoming call is resumed. If an off-hook signal is received at decision 612, the process advances to step 613 where an acknowledgment message of the off-hook signal is transmitted on the selected channel to the handset unit. With the successful completion of these steps, the public base unit is seized by the handset unit and operates as a dedicated base unit in step 614 providing dial tone to the handset unit and establishing a communications link over the selected channel.

Once the communications link has been established, the process enters the call-in-progress routine and advances to step 615 where it monitors the selected channel for receipt of a digit. In decision 616, any digit received from the assigned handset unit over the selected channel by the public base unit is detected and in step 617 this digit is translated into a dual-tone-multiple-frequency signal and transmitted to the central office.

If the receipt of a digit over the selected channel is not detected in decision 616, the process advances to decision 618 which monitors the receipt of function requests provided over the selected channel. If a function request is received, the process advances to step 619 where the function request is executed. If a function request is not received at step 618, the process advances to decision 620 which looks for an on-hook opcode message reflecting that the user desires to terminate the call. If this opcode message is not received, the process returns to step 615 and repeats the call-in-progress routine. If this opcode message is received, however, the public base unit is released in the call-tear-down step 621 and the process returns to the initialization step 601 where the public base unit once again begins to monitor each of the predetermined channels for an incoming signal.

Various other modifications of this invention are contemplated and may obviously be resorted to by those skilled in the art without departing from the spirit and scope of the invention as hereinafter defined by the appended claims.

We claim:

1. A cordless telephone base unit for operation over a plurality of frequency channels in a public cordless telephone system, the base unit being connectable to a telephone line for communicating with a central office and the telephone system including at least one cordless handset unit for generating a service request signal over any one of the plurality of frequency channels for establishing communications with the base unit, the base unit comprising:

means for receiving the service request signal from the handset unit over a selected one of the plurality of frequency channels selected by the handset unit, the service request signal including an identification code that is unique to the handset unit;

means for generating a service request acknowledge signal over the selected one of the plurality of frequency channels;

means for generating a plurality of time delays on the selected one of the plurality of frequency channels for use by the base unit in responding to the handset unit, in response to reception of the service request signal from the handset unit, the base unit generating the service request acknowledge signal and including therein a base unit identification code and the identification code received in the service request signal from the handset unit for responding directly to the handset unit after any one of the plurality of time delays;

assigning means for designating a specific one of the plurality of time delays after which the base unit responds to the handset unit; and means for establishing a dedicated communications link with the handset unit over the selected one of the frequency channels, the base unit being unresponsive to all communication attempts unaccompanied by the identification code unique to said handset unit.

2. A method of operating over a plurality of frequency channels with a cordless telephone base unit in a public cordless telephone system, the base unit being connectable to a telephone line for communicating with a central office and the telephone system including at least one cordless handset unit for generating a service request signal over any one of the plurality of frequency channels for establishing communications with the base unit, the method comprising the steps of:

receiving the service request signal from the handset unit over a selected one of the plurality of frequency channels selected by the handset unit, the service request signal including an identification code that is unique to the handset unit;

generating a service request acknowledge signal in the base unit over the selected one of the plurality of frequency channels;

generating a plurality of time slots on the selected one of the plurality of frequency channels for use by the base unit in responding to the handset unit, in response to reception of the service request signal from the handset unit, the base unit generating the service request acknowledge signal and including therein a base unit identification code and the identification code received in the service request signal from the handset unit for responding directly to the handset unit in any one of the plurality of time slots;

assigning a specific one of the plurality of time slots in which the base unit responds to the handset unit; and establishing a dedicated communications link with the handset unit over the selected one of the frequency channels, the base unit being unresponsive to all communication attempts unaccompanied by the identification code unique to said handset unit.

3. The method of operating with a cordless telephone base unit as in claim 2 wherein the assigning step further comprises the step of generating a random number from within a set of numbers, each number within the set of numbers corresponding to a time slot within the plurality of time slots and the specific one of the plurality of time slots corresponding to the generated random number.

4. The method of operating with a cordless telephone base unit as in claim 2 further comprising the step of selecting a signal level from within a range of signal levels, the selected signal level being proportional to the received signal strength of the service request signal from the handset unit.

5. The method of operating with a cordless telephone base unit as in claim 4 further comprising the step of allocating each signal level within the range of signal levels to a corresponding time slot within the plurality of time slots.

6. The method of operating with a cordless telephone base unit as in claim 5 further comprising the step of designating the specific one of the plurality of time slots in which the base unit responds to the handset unit.

7. The method of operating with a cordless telephone base unit as in claim 4 further comprising the step of allocating the range of signal levels into multiple subsets, each signal level being allocated to a specific one of the multiple subsets, and each subset containing a plurality of time slots.

8. The method of operating with a cordless telephone base unit as in claim 7 further comprising the step of generating a random number from a group of numbers contained within each subset of the range of signal levels, each number within the group of numbers corresponding to a time slot within each subset of the range of signal levels.

9. The method of operating with a cordless telephone base unit as in claim 8 further comprising the step of designating in accordance with the generated random number the specific one of the plurality of time slots in which the base unit responds to the handset unit.

10. A cordless telephone base unit for operation over a plurality of frequency channels in a public cordless telephone system, the base unit being connectable to a telephone line for communicating with a central office and the telephone system including at least one cordless handset unit for generating a service request signal over any one of the plurality of frequency channels for establishing communications with the base unit, the base unit comprising:
   means for receiving the service request signal from the handset unit over a selected one of the plurality of frequency channels selected by the handset unit, the service request signal including an identification code that is unique to the handset unit;
   means for generating a service request acknowledge signal over the selected one of the plurality of frequency channels;
   means for generating a plurality of time slots on the selected one of the plurality of frequency channels for use by the base unit in responding to the handset unit, in response to reception of the service request signal from the handset unit, the base unit generating the service request acknowledge signal and including therein a base unit identification code and the identification code received in the service request signal from the handset unit for responding directly to the handset unit in any one of the plurality of time slots;
   assigning means for designating a specific one of the plurality of time slots in which the base unit responds to the handset unit; and
   means for establishing a dedicated communications link with the handset unit over the selected one of the frequency channels, the base unit being unresponsive to all communication attempts unaccompanied by the identification code unique to said handset unit.

11. The cordless telephone base unit as in claim 10 wherein the assigning means comprises means for generating a random number from within a set of numbers, each number within the set of numbers corresponding to a time slot within the plurality of time slots and the specific one of the plurality of time slots corresponding to the generated random number.

12. The cordless telephone base unit as in claim 11 wherein the time slots are arranged contiguously within the plurality of time slots.

13. The cordless telephone base unit as in claim 11 wherein within the set of numbers a first randomly generated number having a smaller magnitude than a second randomly generated number is assigned an earlier occurring time slot for responding to the service request signal from the handset unit.

14. The cordless telephone base unit as in claim 13 wherein the base unit responds to the request for service signal from the handset unit by generating the service request acknowledge signal in the specific one of the plurality of time slots designated by the assigning means.

15. The cordless telephone base unit as in claim 10 further comprising signal strength determining means for selecting from within a range of signal levels, a signal level proportional to the received signal strength of the service request signal from the handset unit.

16. The cordless telephone base unit as in claim 15 further comprising means for allocating each signal level within the range of signal levels to a corresponding time slot within the plurality of time slots.

17. The cordless telephone base unit as in claim 16 wherein responsive to the allocating means, the assigning means designating the specific one of the plurality of time slots in which the base unit responds to the handset unit.

18. The cordless telephone base unit as in claim 17 wherein the allocating means assigns each signal level to the corresponding time slot in such a way that successive time slots are assigned to successively lower signal strengths reflective of the service request signal received from the handset unit.

19. The cordless telephone base unit as in claim 18 wherein the base unit responds to the request for service signal from the handset unit by generating the service request acknowledge signal in the specific one of the plurality of time slots designated by the assigning means.

20. The cordless telephone base unit as in claim 15 further comprising means for allocating the range of signal levels into multiple subsets, each signal level being allocated to a specific one of the multiple subsets, and each subset containing a plurality of time slots.

21. The cordless telephone base unit as in claim 20 wherein the assigning means further comprises means for generating a random number from a group of numbers contained within each subset of the range of signal levels, each number within the group of numbers corresponding to a time slot within each subset of the range of signal levels.

22. The cordless telephone base unit as in claim 21 wherein the assigning means, responsive to both the allocating means and the random number generating means, designates the specific one of the plurality of time slots in which the base unit responds to the handset unit.

23. The cordless telephone base unit as in claim 22 wherein the allocating means assigns each signal level to the specific one of the multiple subsets inversely proportional in magnitude to the received signal strength of the service request signal from the handset unit, a first signal level having a greater received signal strength than a second signal level being assigned a subset containing earlier occurring time slots for responding to the service request signal from the handset unit.

24. The cordless telephone base unit as in claim 23 wherein the base unit responds to the request for service signal from the handset unit by generating the service request acknowledge signal in the specific one of the plurality of time slots designated by the assigning means.

* * * * *